(12) United States Patent
Ozawa

(10) Patent No.: US 7,505,190 B2
(45) Date of Patent: Mar. 17, 2009

(54) ELECTRO-OPTICAL DEVICE SUBSTRATE, ELECTRO-OPTICAL DEVICE, AND ELECTRONIC APPARATUS

(75) Inventor: Norihiko Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/999,118

(22) Filed: Dec. 4, 2007

(65) Prior Publication Data

US 2008/0137167 A1 Jun. 12, 2008

(30) Foreign Application Priority Data

Dec. 11, 2006 (JP) ............................. 2006-332904

(51) Int. Cl.
*G02F 1/07* (2006.01)
(52) U.S. Cl. ...................... 359/254; 359/245
(58) Field of Classification Search ............... 359/245, 359/254, 315
See application file for complete search history.

(56) References Cited

U.S. PATENT DOCUMENTS 6,411,423 B2 * 6/2002 Ham .......................... 359/290

FOREIGN PATENT DOCUMENTS

JP 2006-133261 A 5/2006

* cited by examiner

*Primary Examiner*—William C Choi
(74) *Attorney, Agent, or Firm*—AdvantEdge Law Group, LLC

(57) ABSTRACT

An electro-optical device substrate includes a first transparent substrate; a second transparent substrate that faces the first transparent substrate, the second transparent substrate including recesses in non-aperture regions of a surface of the second transparent substrate that faces the first transparent substrate, the recesses causing light that is incident to the non-aperture regions to refract toward aperture regions; and an adhesive that bonds the first and second transparent substrates together.

8 Claims, 6 Drawing Sheets

ELECTRO-OPTICAL DEVICE SUBSTRATE, ELECTRO-OPTICAL DEVICE, AND ELECTRONIC APPARATUS

BACKGROUND

1. Technical Field

The present invention relates to an electro-optical device substrate used for an electro-optical device, such as a liquid crystal device, to an electro-optical device including the electro-optical device substrate, and an electronic apparatus, such as a liquid crystal projector, including the electro-optical device.

2. Related Art

An electro-optical device, such as a liquid crystal device, includes a thin-film transistor (TFT) array substrate in which various lines, such as data lines, scanning lines, and capacitor lines, and various electronic elements, such as TFT transistors, are provided in an image display area of the electro-optical device and a counter substrate. The TFT array substrate and the counter substrate are disposed so as to face each other with an electro-optical material layer, such as a liquid crystal layer, therebetween. With this configuration, when parallel light is incident to the electro-optical device, only the amounts of light corresponding to the aperture ratios of pixels among the total amount of light can be used.

Thus, in the related art, a microlens array including microlenses corresponding to pixels is provided in a counter substrate or a microlens-array plate is attached to the counter substrate. By using such microlenses, light that travels toward non-aperture regions, which are regions other than aperture regions of the pixels, is condensed for individual pixels and is guided to the aperture regions of the pixels when penetrating through an electro-optical material layer. Thus, such an electro-optical device is capable of providing a bright display.

Such a microlens-array plate is manufactured by gluing, using an adhesive made of photocurable resin, a cover glass to one side of a transparent plate member including a recessed portion and a protruding portion that define a curved surface of each of the microlenses. For example, a technology for maintaining a predetermined thickness of an adhesive used for a microlens-array plate is disclosed in Japanese Unexamined Patent Application Publication No. 2006-133261.

In the case of using the microlens array described above, however, it is practically difficult to accurately control the configurations of microlenses, such as the sizes and curvatures of the microlenses. There is a technical problem in that it is difficult to form microlenses having desired configurations. Thus, a desired light-condensing ability may not be achieved, resulting in a deterioration in display quality. As a result, the manufacturing yield may be reduced, resulting in a reduction in the reliability of the apparatus.

SUMMARY

An advantage of some aspects of the invention is that it provides an electro-optical device substrate that is capable of allowing light to be efficiently condensed into aperture regions of pixels and that can be manufactured relatively easily, an electro-optical device including the electro-optical device substrate, and an electronic apparatus including the electro-optical device.

An electro-optical device substrate according to an aspect of the invention includes a first transparent substrate; a second transparent substrate that faces the first transparent substrate, the second transparent substrate including recesses in non-aperture regions of a surface of the second transparent substrate that faces the first transparent substrate, the recesses causing light that is incident to the non-aperture regions to refract toward aperture regions are provided; and an adhesive that bonds the first and second transparent substrates together.

The electro-optical device substrate is used, for example, as a counter substrate that is disposed so as to face an element substrate with an electro-optical material layer, such as a liquid crystal layer, therebetween. In the element substrate, various lines, such as data lines and scanning lines, and various electronic elements, such as pixel switching TFTs, are provided in a pixel area (or referred to as an "image display area"). In the pixel area, a plurality of pixels are disposed.

The electro-optical device substrate includes the first and second transparent substrates, which are made of, for example, glass. The first and second transparent substrates are disposed so as to face each other. For example, the first and second transparent substrates are bonded together using an adhesive made of, for example, transparent resin.

Typically, the adhesive is applied all over the first or second transparent substrate and is disposed between the first and second transparent substrates.

According to the aspect of the invention, in particular, the recesses are provided by, for example, etching at least in portions of non-aperture regions of the surface of the second transparent substrate that faces the first transparent substrate. The "non-aperture regions" in the aspect of the invention represents regions other than aperture regions. The "aperture regions" in the aspect of the invention represents regions, such as regions in the pixel area in which light contributed to display is emitted for each pixel, that is, regions in which electro-optical operations by electro-optical elements or electro-optical materials are actually performed within an effective area. The non-aperture regions are regions, such as regions in the pixel area in which light contributed to display is not emitted for each pixel, that is, regions in which electro-optical operations by electro-optical elements or electro-optical materials are not actually performed within the effective area. For example, in a case where a plurality of pixels are arranged in a matrix within the pixel area, the aperture regions are defined as matrix regions corresponding to respective pixels, and the non-aperture regions are defined as, for example, grid regions that separate the aperture regions provided for respective pixels.

The recesses in the surface of the second transparent substrate are formed, for example, as V-shaped recesses or V recesses, and provided so as to surround the aperture regions or provided along sides of the aperture regions, when viewed from a planar point of view on the second transparent substrate. Since the second transparent substrate and the first transparent substrate are bonded together using the adhesive, light refractors, which are portions of the adhesive that are provided in the recesses, are formed. Portions of surfaces of the light refractors are defined by recess surfaces of the recesses. With the provision of the recesses formed as, for example, V-shaped recesses, in the non-aperture regions of the second transparent substrate (that is, the light refractors, which are portions of the adhesive that are provided in the recesses and have a refractive index that is different from the second transparent substrate made of, for example, glass), light that is incident from the first transparent substrate to the non-aperture regions can be refracted toward the aperture regions and, for example, can be emitted to the aperture regions of the element substrate. That is, the recess surfaces of the recesses serve as lens surfaces causing light that is incident to the non-aperture regions to be condensed into the aperture regions. Namely, for example, light can be efficiently condensed into the aperture regions of the plurality of pixels arranged in the pixel area of the element substrate that faces the electro-optical device substrate with an electro-optical material layer, such as liquid crystal layer, therebetween.

In addition, compared with a case where a recessed portion or a protruding portion defining a lens curve of a microlens is formed for each of the aperture regions of the second transparent substrate, the above-described recesses can be formed more easily. That is, by using recesses each having, for example, a V shape, which can be formed more easily than microlenses, light can be efficiently condensed into each of the aperture regions. Thus, the manufacturing yield can be improved, and the reliability of the electro-optical device substrate can be increased.

As described above, in the electro-optical device substrate, by using the recesses provided in the non-aperture regions of the second transparent substrate, light can be efficiently condensed into the aperture regions of pixels. In addition, since such recesses can be formed more easily than, for example, microlenses, an electro-optical device substrate with an excellent reliability can be provided.

It is preferable that the adhesive is disposed inside the recesses.

With this configuration, the adhesive is disposed in the recesses, and the adhesive is not disposed in other regions between the first and second transparent substrates. That is, the adhesive is not provided at least in the aperture regions between the first and second transparent substrates. Thus, an adverse influence on image display caused by mixture of air bubbles or impurities into the adhesive in a case where the adhesive is provided in the aperture regions can be reduced or prevented.

In addition, it is preferable that the adhesive is disposed at least in the aperture regions and the non-aperture regions between the first and second transparent substrates.

With this configuration, the adhesive is formed as an adhesive film or an adhesive layer over a relatively wide area including the aperture regions and the non-aperture regions between the first and second transparent substrates. Thus, bonding between the first and second transparent substrates can be assured, and control of the film thickness and the like of the adhesive can be achieved relatively easily.

In addition, it is preferable that a light-shielding film is formed at least in portions of the non-aperture regions of a surface of the second transparent substrate that is opposite the surface of the second transparent substrate facing the first transparent substrate.

With this configuration, with the use of the light-shielding film, for example, shielding of pixel switching TFTs provided in the non-aperture regions of the element substrate that faces the electro-optical device substrate can be achieved.

In the configuration in which the light-shielding film is formed, the recesses may be formed at least in light-shielding portions of the non-aperture regions, the light-shielding portions being portions where the light-shielding film is formed.

In this case, with the provision of the recesses, at least light that is incident to the light-shielding portions of the non-aperture regions can be reliably refracted toward the aperture regions. Thus, light that is incident to the non-aperture regions can be condensed into the aperture regions more reliably.

In the configuration in which the recesses are formed at least in the light-shielding portions, the light-shielding film may be formed as a grid pattern defining the non-aperture regions. In addition, the recesses may be formed in the light-shielding portions.

In this case, the light-shielding film serves as a so-called black matrix. In addition, the recesses can be formed as, for example, a grid pattern corresponding to the light-shielding portions. Thus, light that is incident to the non-aperture regions can be condensed into the non-aperture regions more reliably.

An electro-optical device according to another aspect of the invention includes the above-described electro-optical device substrate (according to any one of various aspects of the invention).

Since the electro-optical device includes the above-described electro-optical device substrate, a high-quality image can be displayed. The electro-optical device includes, for example, the above-described electro-optical device substrate and, for example, an element substrate in which various lines, such as data lines and scanning lines, and various electronic elements, such as pixel switching elements, are provided in a pixel area including a plurality of pixels. The electro-optical device substrate and the element substrate are disposed so as to face each other with an electro-optical material layer, such as a liquid crystal layer, therebetween.

An electronic apparatus according another aspect of the invention includes the above-described electro-optical device.

The electronic apparatus includes the above-described electro-optical device. Thus, various electronic apparatuses that achieve high-quality image display, such as a projection display apparatus, a television set, a cellular phone, an electronic notebook, a word processor, a view-finder type or monitor direct-view type video tape recorder, a workstation, a television telephone, a point-of-sale (POS) terminal, an apparatus provided with a touch panel, and the like, can be provided. Also, the electronic apparatus may be an electrophoretic device, such as electronic paper, an electron emission device (a field emission display or a conduction electron-emitter display), or a display apparatus using such an electrophoretic device or an electron emission device.

The operations and other advantages of the invention will become apparent from the description of exemplary embodiments provided below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Electro-optical device substrates, electro-optical devices, and electronic apparatuses according to embodiments of the invention will be described. In an embodiment of the invention, as an example of an electro-optical device according to an aspect of the invention, a TFT active-matrix-driven liquid crystal device containing driving circuits will be described.

First Embodiment

A liquid crystal device according to a first embodiment will be described with reference to FIGS. 1 to 6.

Figure 1:
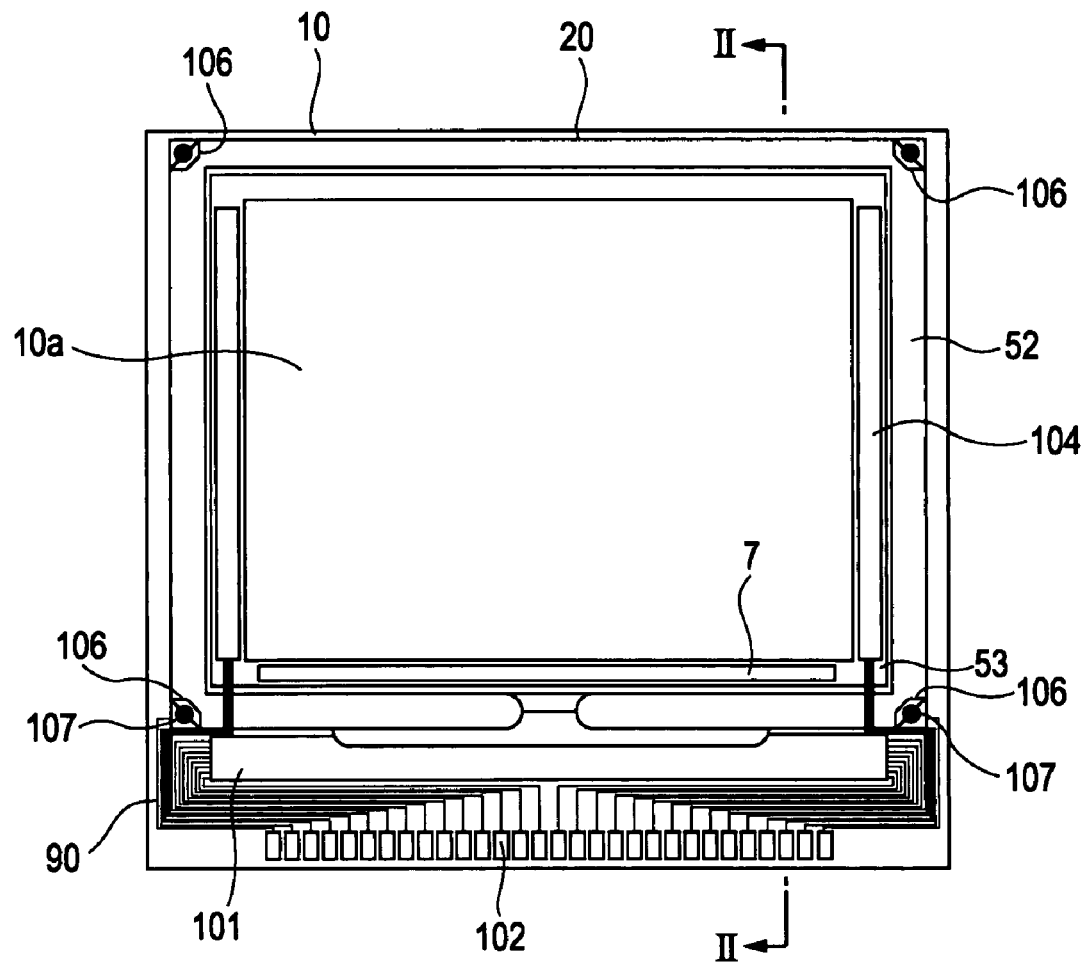
FIG. 1 is a plan view showing the entire configuration of a liquid crystal device according to a first embodiment.
Figure 2:
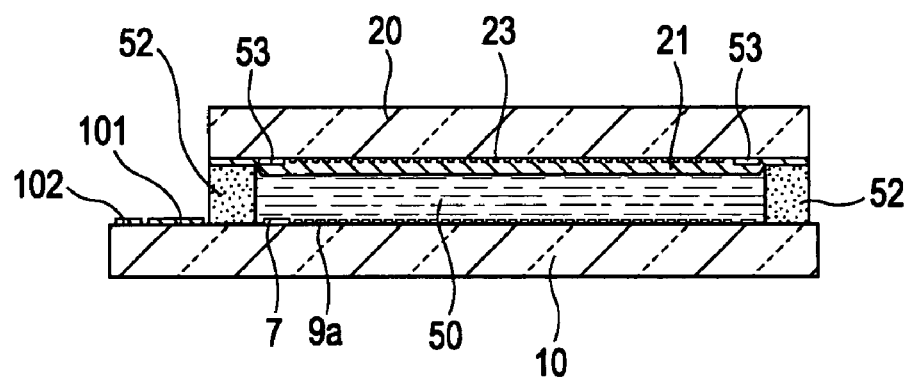
FIG. 2 is a cross-sectional view taken along the line II-II in FIG. 1.

The entire configuration of the liquid crystal device according to the first embodiment will be described with reference to FIGS. 1 and 2. FIG. 1 is a plan view showing the configuration of the liquid crystal device according to the first embodiment. FIG. 2 is a cross-sectional view taken along the line II-II in FIG. 1.

Referring to FIGS. 1 and 2, in the liquid crystal device according to the first embodiment, a TFT array substrate 10 and a counter substrate 20, which is an example of an "electro-optical device substrate" according to an aspect of the invention, are disposed so as to face each other. A liquid crystal layer 50 is filled in a space between the TFT array substrate 10 and the counter substrate 20. The TFT array substrate 10 and the counter substrate 20 are bonded together using a sealing material 52 provided in a sealing area disposed around an image display area 10a.

Referring to FIG. 1, on the counter substrate 20, a frame-like light-shielding film 53 that defines a frame-like region of the image display area 10a is disposed further inward than and in parallel to the sealing area, which is an area where the sealing material 52 is disposed. Part or all of the frame-like light-shielding film 53 may be provided as an internal light-shielding film on the TFT array substrate 10. In a portion of a peripheral area disposed around the image display area 10a, the portion being further outward than the sealing area, which is an area where the sealing material 52 is disposed, a data-line driving circuit 101 and external-circuit connecting terminals 102 are disposed along a side of the TFT array substrate 10. A sampling circuit 7 is disposed further inward than the sealing area and along the side along which the data-line driving circuit 101 and the external-circuit connecting terminals 102 are disposed. The sampling circuit 7 is covered with the frame-like light-shielding film 53. Scanning-line driving circuits 104 are disposed further inward than the sealing area and along two sides adjacent to the side along which the data-line driving circuit 101 and the external-circuit connecting terminals 102 are disposed. The scanning-line driving circuits 104 are covered with the frame-like light-shielding film 53. Vertical conductive terminals 106 for connecting the TFT array substrate 10 and the counter substrate 20 using vertical conductive materials 107 are disposed in portions of the counter substrate 10 that face four corner portions of the counter substrate 20. Accordingly, electrical conduction between the TFT array substrate 10 and the counter substrate 20 can be achieved.

Routing wiring patterns 90 that are provided for electrically connecting the external-circuit connecting terminals 102 to the data-line driving circuit 101, the scanning-line driving circuits 104, the vertical conduction terminals 106, and the like are disposed on the TFT array substrate 10.

Figure 5:
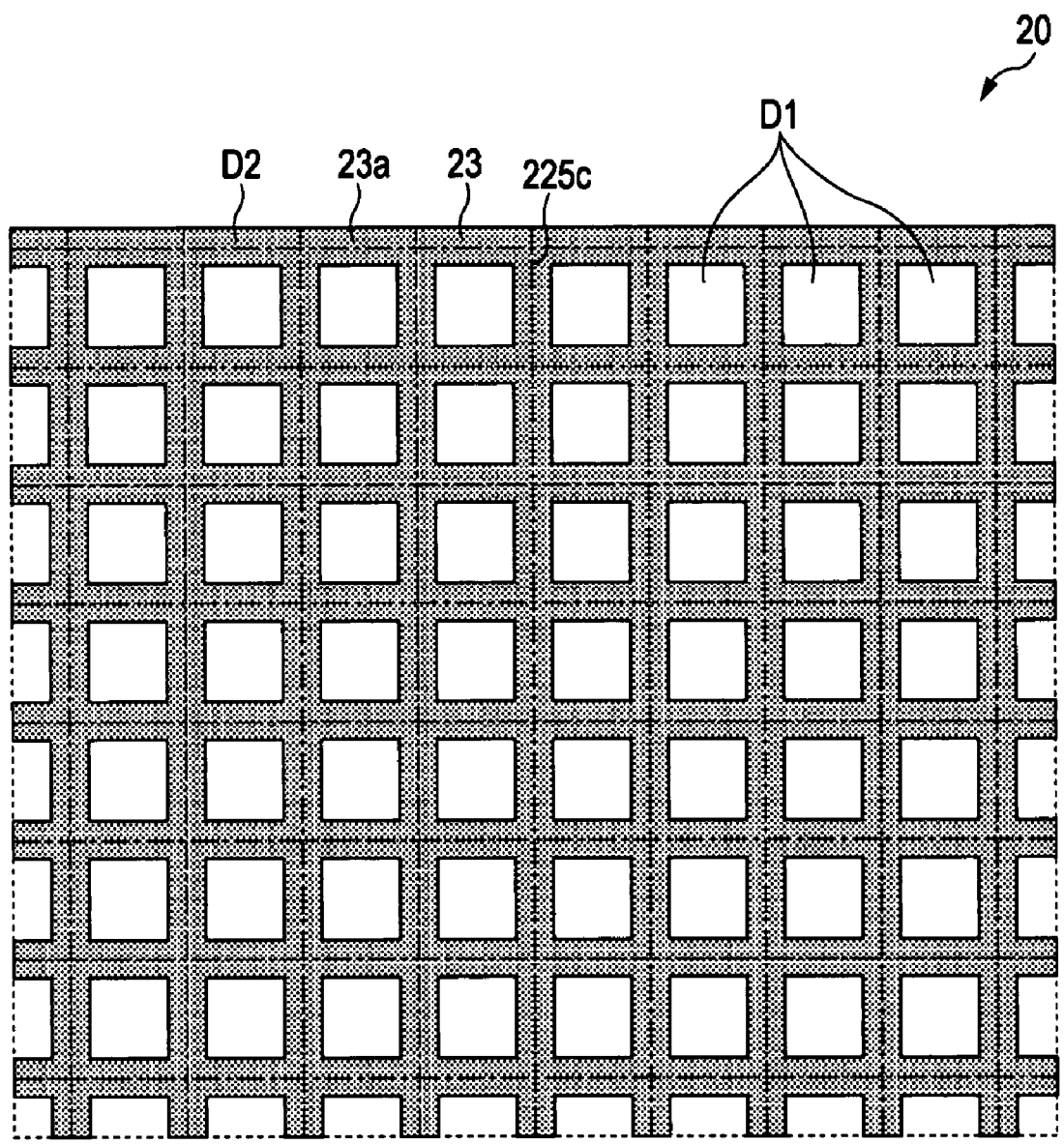
FIG. 5 is a plan view schematically showing the positional relationship between a light-shielding film and a recess of a counter substrate.

Referring to FIG. 2, a laminated structure in which pixel switching TFTs and lines, such as scanning lines and data lines, are provided is formed on the TFT array substrate 10. In the image display area 10a, pixel electrodes 9a are disposed in a matrix on a layer upper than the pixel switching TFTs and the lines, such as the scanning lines and the data lines. On the pixel electrodes 9a, an alignment film (not shown) is formed. In contrast, a light-shielding film 23 is formed on a surface of the counter substrate 20 that faces the TFT array substrate 10. The light-shielding film 23 is, for example, a light-shielding metal film. As shown in FIG. 5, the light-shielding film 23 is patterned in a grid shape within the image display area 10a on the counter substrate 20. A counter electrode 21, which is made of transparent material, such as indium tin oxide (ITO), is formed over the light-shielding film 23 such that the counter electrode 21 is provided substantially all over the counter substrate 20 so as to face the pixel electrodes 9a. On the counter electrode 21, an alignment film (not shown) is formed. The liquid crystal layer 50 is formed of one type of nematic liquid crystal or a mixture of a plurality of types of nematic liquid crystal. A predetermined alignment condition is achieved between a pair of alignment films.

Although not illustrated, an inspection circuit, an inspection pattern, and the like for checking the quality of the liquid crystal device or detecting a defect during manufacturing and before shipment, as well as the data-line driving circuit 101 and the scanning-line driving circuits 104, may be formed on the TFT array substrate 10.

Figure 3:
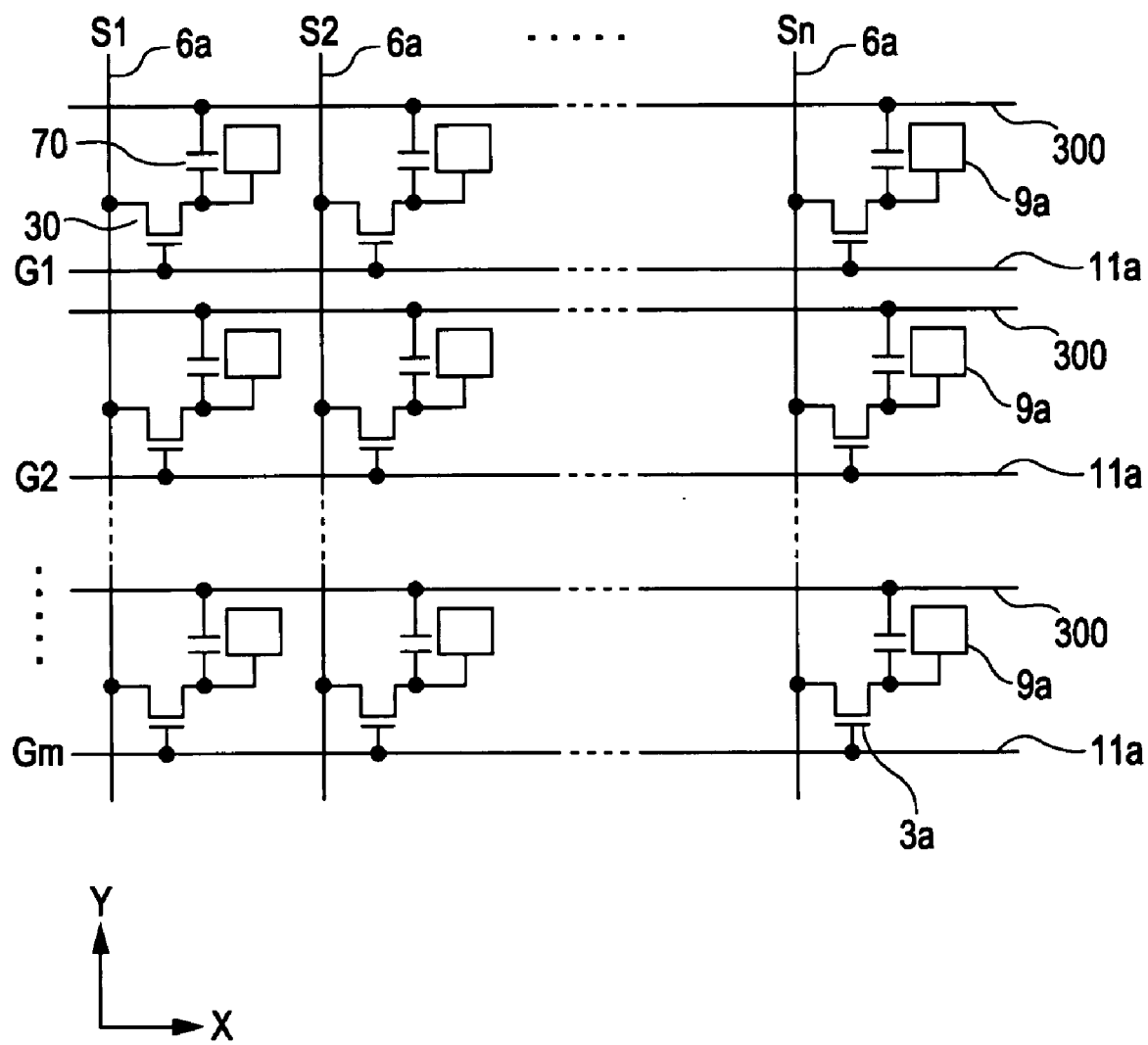
FIG. 3 is an equivalent circuit diagram of a plurality of pixel portions of the liquid crystal device according to the first embodiment.

The electrical connection structure of a pixel portion of the liquid crystal device according to the first embodiment will be described with reference to FIG. 3. FIG. 3 is an equivalent circuit diagram of various elements, lines, and the like for a plurality of pixels arranged in a matrix and constituting an image display area of the liquid crystal device according to the first embodiment.

Referring to FIG. 3, the plurality of pixels arranged in a matrix and constituting the image display area 10a each includes a pixel electrode 9a and a TFT 30. The TFTs 30 are electrically connected to the pixel electrodes 9a and perform switching control of image signals supplied to the pixel electrodes 9a when the liquid crystal device operates. Data lines 6a to which image signals are supplied are electrically connected to sources of the corresponding TFTs 30. Image signals S1, S2, . . . , and Sn to be written to the data lines 6a may be supplied line-sequentially in that order. Alternatively, image signals may be supplied to each group of adjacent data lines 6a.

Scanning lines 11a are electrically connected to the gates 3a of the corresponding TFTs 30. Pulse-type scanning signals G1, G2, . . . , and Gm are applied line-sequentially in that order to the scanning lines 11a at predetermined timings. The pixel electrodes 9a are electrically connected to the drains of the corresponding TFTs 30. By turning on the TFTs 30, which serve as switching elements, for a predetermined period of time, image signals S1, S2, . . . , and Sn supplied from the data lines 6a are written to the pixel electrodes 9a at predetermined timings. The image signals S1, S2, . . . , and Sn at predetermined levels written to the liquid crystal layer 50 (see FIG. 2) through the pixel electrodes 9a are held for a predetermined period of time between the pixel electrodes 9a and the counter electrode 21 (see FIG. 2), which is formed on the counter substrate 20.

Since the alignment and order of liquid crystal molecules change in accordance with the level of an applied voltage, liquid crystal forming the liquid crystal layer 50 modulates light and thus achieves grayscale display. In a normally white mode, the transmission factor with respect to incident light decreases in accordance with a voltage applied for each pixel. In a normally black mode, the transmission factor with respect to incident light increases in accordance with a voltage applied for each pixel. As a whole, light having a contrast level in accordance with an image signal is emitted from the liquid crystal device. In order to avoid leakage of an image signal held in liquid crystal, storage capacitors 70 are electrically connected in parallel to liquid crystal capacitors formed between the pixel electrodes 9a and the counter electrode 21. First electrodes of the storage capacitors 70 are electrically connected to the pixel electrodes 9a. Second electrodes of the storage capacitors 70 are connected to capacitor lines 300 for supplying constant potentials. The storage capacitors 70 are capacitor elements serving as hold capacitors that temporally hold potentials of the corresponding pixel electrodes 9a in accordance with supplied image signals. With the use of the storage capacitors 70, the potential holding characteristics of the pixel electrodes 9a can be improved. Thus, improvements in display characteristics, such as an improvement in the contrast and a reduction in flicker, can be achieved.

Figure 4:
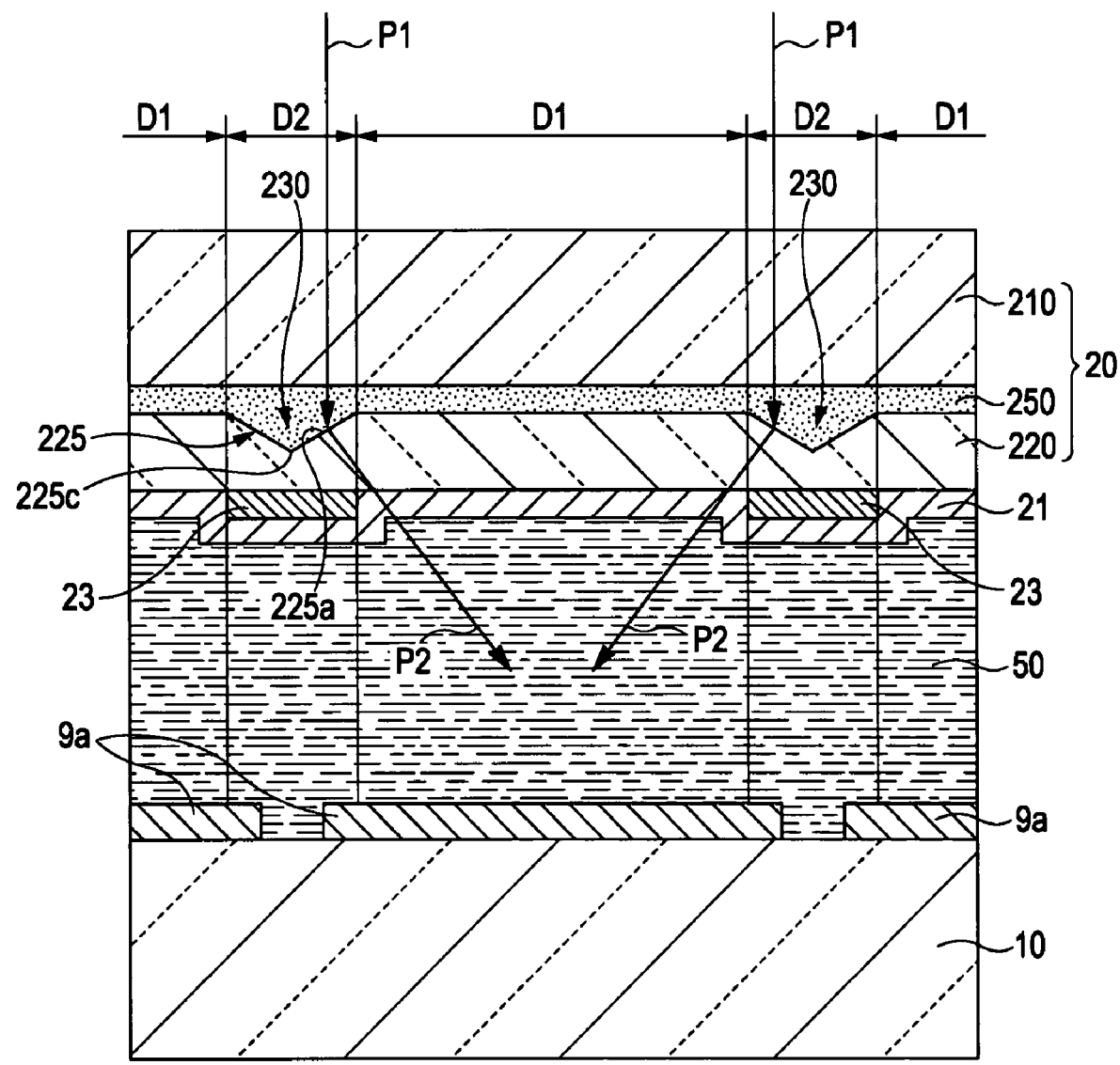
FIG. 4 is a cross-sectional view of a pixel in which the structure the cross section shown in FIG. 2 is described in more details.

The detailed configuration of the counter substrate 20 of the liquid crystal device according to the first embodiment will be described with reference to FIGS. 4 and 5. FIG. 4 is a cross-sectional view of a pixel in which the structure of the cross section shown in FIG. 2 is described in more details. FIG. 5 is a plan view schematically showing the positional relationship between a light-shielding film and a recess of the counter substrate 20. In FIG. 4, different scales are used for layers and members so that the layers and the members can be visually recognized in the drawing. Although only one pixel is illustrated in FIG. 4, other pixels have similar configurations.

Referring to FIG. 4, the counter substrate 20 includes transparent substrates 210 and 220 that face each other. The transparent substrates 210 and 220 are bonded together using an adhesive 250. The adhesive 250 is made of transparent resin adhesive material, such as thermosetting resin adhesive material or photocurable resin adhesive material. The adhesive 250 is applied all over the transparent substrate 210 or 220 and is disposed between the transparent substrates 210 and 220. Then, the adhesive 250 is made curable.

The transparent substrate 210 is an example of a "first transparent substrate" according to an aspect of the invention. The transparent substrate 210 is a glass substrate.

The transparent substrate 220 is an example of a "second transparent substrate" according to an aspect of the invention. The transparent substrate 220 is a glass substrate having a thickness that is smaller than the thickness of the transparent substrate 210. Recesses 225 are provided in non-aperture regions D2 of a surface of the transparent substrate 220 that faces the transparent substrate 210 (that is, a side that contacts the adhesive 250, namely, the upper side in FIG. 4). In contrast, the light-shielding film 23 (see FIG. 2) is provided in the non-aperture regions D2 of a surface of the transparent substrate 220 that does not face the transparent substrate 210 (that is, a side that is opposite the side contacting the adhesive 250, namely, the lower side in FIG. 4). In addition, the counter electrode 21 (see FIG. 2) is provided substantially all over the transparent substrate 220 so as to cover the light-shielding film 23. On the counter electrode 21, an alignment film (not shown) is formed.

As shown in FIG. 5, the light-shielding film 23 has a grid planar pattern. On the counter substrate 20, the non-aperture regions D2 are defined by the light-shielding film 23 (that is, light-shielding portions 23a, which are portions where the light-shielding film 23 is formed, are defined as the non-aperture regions D2), and portions partitioned by the light-shielding film 23 are defined as aperture regions D1. Alternatively, the light-shielding film 23 may be formed in a stripe shape so that non-aperture regions can be defined by the light-shielding film 23 and various component parts, such as the capacitor lines 300 and the data lines 6a, provided on the TFT array substrate 10.

In FIG. 4, the recesses 225 are each formed in a V shape (that is, the cross section of each of the recesses 225 has a V shape) by, for example, etching so as to overlap with the light-shielding film 23.

As shown in FIG. 5, the recesses 225 form a grid planer pattern, as in the light-shielding film 23. In FIG. 5, only the positions of centers 225c (also see FIG. 4) of the V-shaped recesses 225 are illustrated. The width of each of the recesses 225 is substantially the same as the grid width of the light-shielding film 23.

Referring back to FIG. 4, since the transparent substrate 220 having the recesses 225 and the transparent substrate 210 are bonded together using the adhesive 250, light refractors 230, which are portions of the adhesive 250 that are provided in the recesses 225, are formed in the counter substrate 20. Portions of surfaces of the light refractors 230 are defined by recess surfaces 225a of the recesses 225. The light refractors 230 form a grid planar pattern surrounding the aperture regions D1.

The adhesive 250 is made of transparent resin adhesive material and has a refractive index of, for example, about 1.6 to 1.8, which is different from the refractive index of the transparent substrate 220 made of glass (the refractive index of the transparent substrate 220 is about 1.46). Thus, with the provision of the light refractors 230, light (represented by arrows P1 in FIG. 4) incident from the transparent substrate 210 to the non-aperture regions D2 can be refracted toward the aperture regions D1 and can be emitted as light (represented by arrows P2 in FIG. 4) traveling toward the aperture regions D1 of the TFT array substrate 10. In other words, the recess surfaces 225a of the recesses 225 serve as lens surfaces causing light that is incident to the non-aperture regions D2 to be condensed into the aperture regions D1. That is, light can be efficiently condensed into the aperture regions D1 of the plurality of pixel electrodes 9a arranged in the image display area 10a of the TFT array substrate 10, which faces the counter substrate 20 with the liquid crystal layer 50 therebetween. Namely, among light incident to the counter substrate 20, light traveling toward the non-aperture regions D2 can be efficiently incident to the aperture regions D1 due to a light-condensing function of the recesses 225 (or the light refractors 230 or the recess surfaces 225a), thus improving the use efficiency of light. Thus, the liquid crystal device according to the first embodiment achieves a bright and high-quality image display.

Compared with a case where a recessed portion or a protruding portion defining a lens curve of a microlens is formed for each of the aperture regions D1 of the transparent substrate 220, such recesses 225 can be easily formed with high accuracy. In other words, with the provision of the recesses 225, which can be formed more easily than microlenses, light can be efficiently condensed into each of the aperture regions D1. Thus, the manufacturing yield can be improved, and the reliability of the liquid crystal device can be increased.

In the first embodiment, in particular, the adhesive 250 is formed as a film over a relatively wide area including the aperture regions and the non-aperture regions between the transparent substrates 210 and 220. Thus, bonding between the transparent substrates 210 and 220 can be ensured, and control of the film thickness and the like of the adhesive 250 can be achieved relatively easily.

In the first embodiment, the adhesive 250 is also disposed inside the recesses 225. However, for example, the adhesive 250 may be disposed in part or all of an area other than the recesses 225. For example, the adhesive 250 may be disposed in the peripheral area around the image display area 10*a* so as to surround the image display area 10*a*. In this case, since the recesses 225 are filled with gas, such as air, or are vacuumed, the recess surfaces 225*a* of the recesses 225 are able to serve as lens surfaces causing light that is incident to the non-aperture regions D2 to be condensed into the aperture regions D1.

As described above, the liquid crystal device according to the first embodiment includes the counter substrate 20 according to the first embodiment. Thus, with the provision of the recesses 225 disposed in the non-aperture regions D2 of the transparent substrate 220, light can be efficiently condensed into the aperture regions D1 of pixels. In addition, since the recesses 225 can be formed more easily than, for example, microlenses, a more reliable liquid crystal device can be provided.

Second Embodiment

Figure 6:
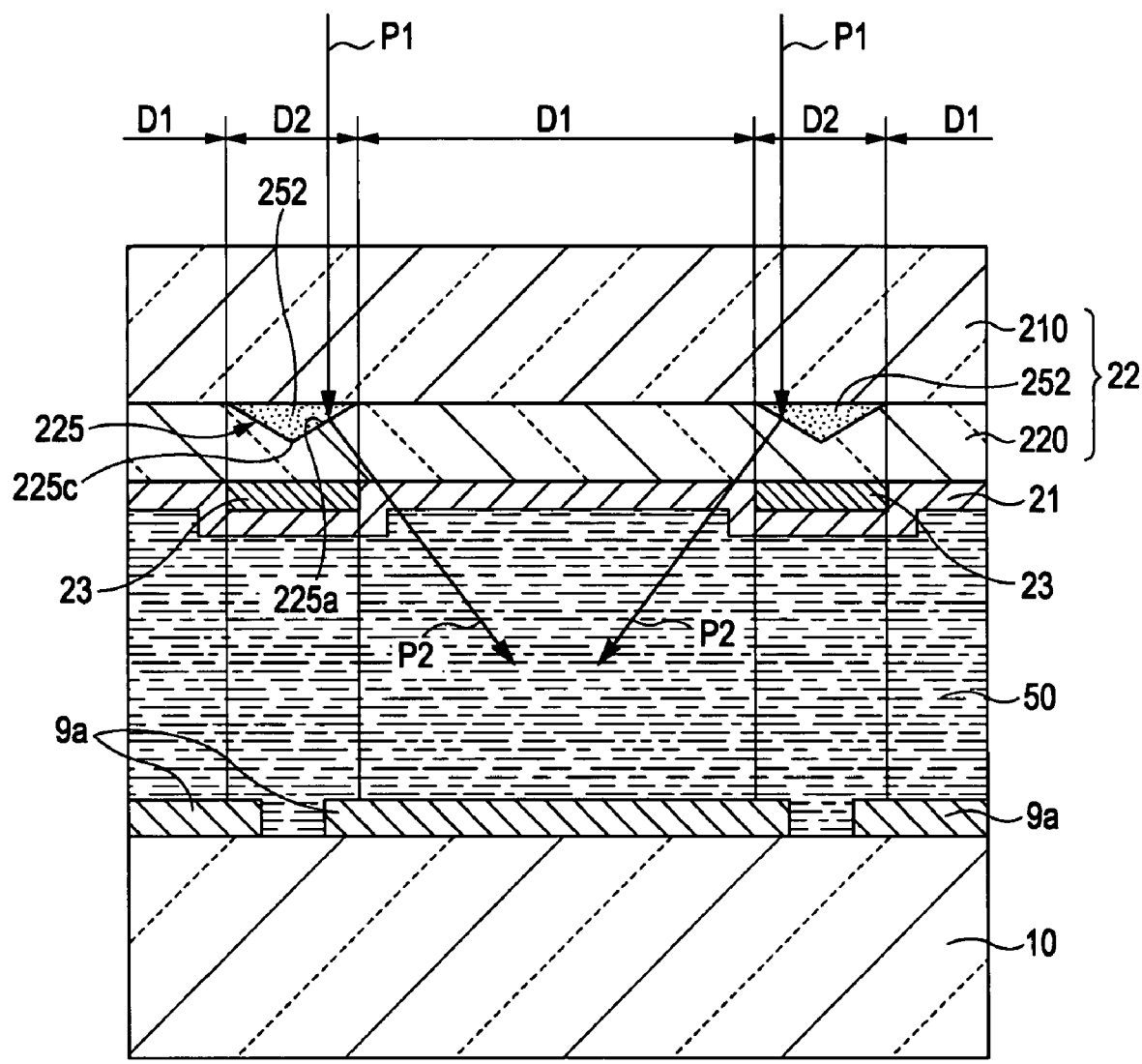
FIG. 6 is a cross-sectional view of a pixel in which the structure of the cross section of a liquid crystal device according to a second embodiment is described in more details.

A liquid crystal device according to a second embodiment of the invention will be described with reference to FIG. 6. FIG. 6 is a cross-sectional view of a pixel in which the structure of the cross section of the liquid crystal device according to the second embodiment is described in more details. In FIG. 6, component parts similar to those in the first embodiment described with reference to FIGS. 1 to 5 are referred to with the same reference numerals and the descriptions of those similar component parts will be omitted when necessary.

Referring to FIG. 6, the liquid crystal device according to the second embodiment is different from the liquid crystal device according to the first embodiment in that the liquid crystal device according to the second embodiment includes a counter substrate 22, instead of the counter substrate 20 used in the first embodiment. In other respects, the liquid crystal device according to the second embodiment has a configuration substantially similar to the liquid crystal device according to the first embodiment.

The counter substrate 22 is different from the counter substrate 20 used in the first embodiment in that the counter substrate 22 includes an adhesive 252, instead of the adhesive 250 used in the first embodiment. In other respects, the counter substrate 22 has a configuration substantially similar to the counter substrate 20 used in the first embodiment. That is, the counter substrate 22 includes the transparent substarates 210 and 220 that face each other. The transparent substrates 210 and 220 are bonded together using the adhesive 252 made of transparent resin adhesive material, such as thermosetting resin adhesive material or photocurable resin adhesive material.

In the second embodiment, in particular, the adhesive 252 is disposed only inside the recesses 225. The adhesive 252 is not disposed other regions between the transparent substrates 210 and 220. That is, the adhesive 252 is not disposed in the aperture regions D1 between the transparent substrates 210 and 220. Thus, an adverse influence on image display caused by mixture of air bubbles or impurities into the adhesive 252 can be reduced.

In addition, in the second embodiment, in particular, the adhesive 252 is disposed inside the recesses 225 and serves as light refractors causing light (represented by arrows P1 in FIG. 6) that is incident from the transparent substrate 210 to the non-aperture regions D2 to be refracted toward the aperture regions D1, similarly to portions of the adhesive 250 that are disposed inside the recesses 225 in the first embodiment.

Electronic Apparatus

Figure 7:
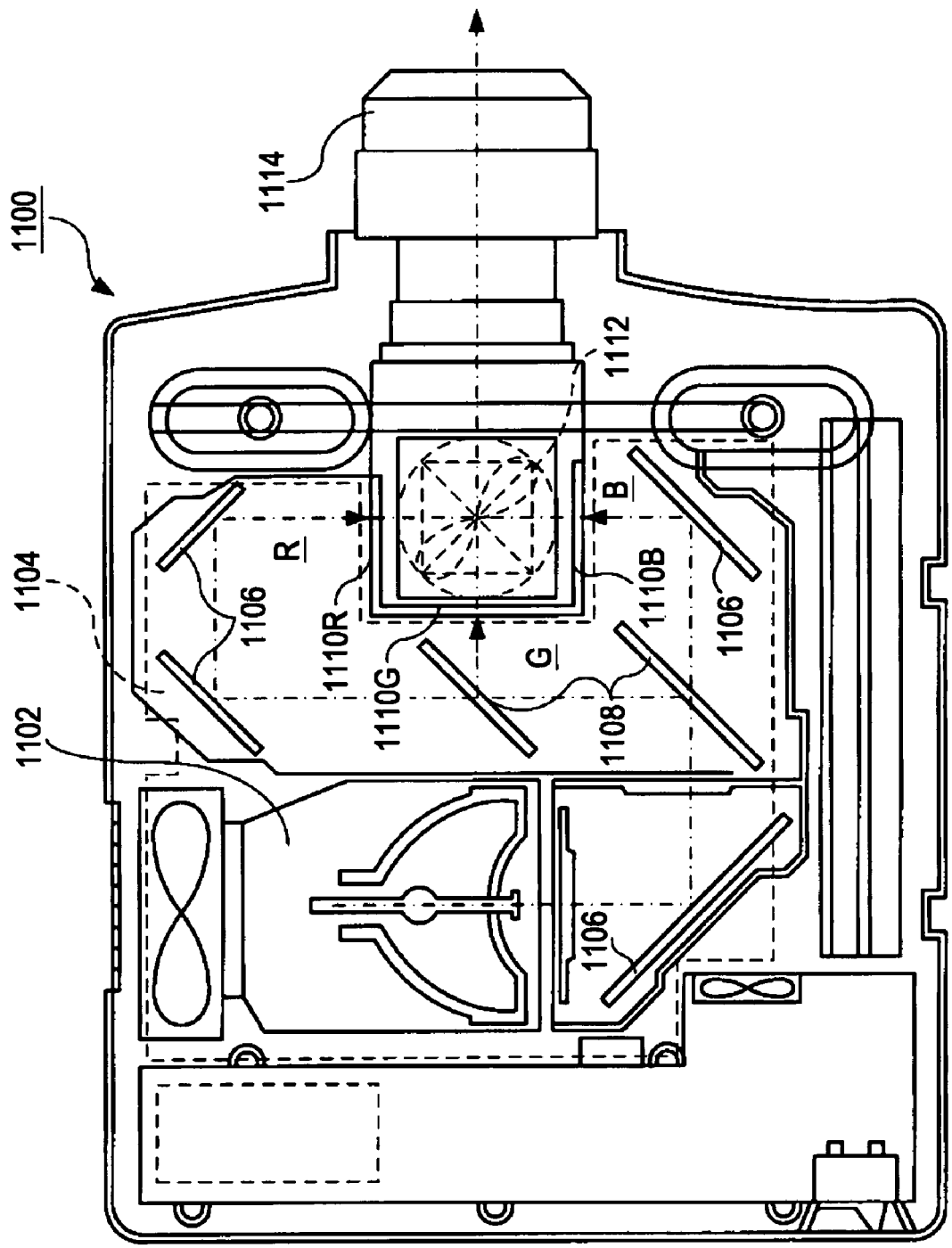
FIG. 7 is a plan view showing the configuration of a projector, which is an example of an electronic apparatus, using an electro-optical device.

A case where any one of the above-described liquid crystal devices, which are electro-optical devices, is used in various electronic apparatuses will be described. FIG. 7 is a plan view showing an example of the configuration of a projector. A projector using the liquid crystal device as a light valve will be described.

As shown in FIG. 7, a lamp unit 1102 including a white light source, such as a halogen lamp, is provided inside a projector 1100. Projection light emitted from the lamp unit 1102 is separated into three primary colors, a red (R) beam, a green (G) beam, and a blue (B) beam, by four mirrors 1106 and two dichroic mirrors 1108 contained in a light guide 1104, and the beams of the three primary colors are incident to liquid crystal panels 1110R, 1110G, and 1110B serving as light values for the corresponding colors.

The configuration of each of the liquid crystal panels 1110R, 1110G, and 1110B is similar to any one of the above-described liquid crystal devices. The liquid crystal panels 1110R, 1110G, and 1110B are driven in accordance with primary-color signals for corresponding R, G, and B colors supplied from an image signal processing circuit. Beams modulated by the liquid crystal panels 1110R, 110G, and 1110B are incident to a dichroic prism 1112 from three directions. In the dichroic prism 1112, the red beam and the blue beam are refracted at 90 degrees, and the green beam goes straight. Thus, after images of the respective colors are combined together, a color image is projected through a projector lens 1114 onto a screen or the like.

When attention is paid to display images formed by the liquid crystal panels 1110R, 1110G, and 1110B, a display image formed by the liquid crystal panel 1110G needs to be left-right inverted with respect to display images formed by the liquid crystal panels 1110R and 1110B.

Since beams corresponding to R, G, and B colors are incident through the dichroic mirror 1108 to the liquid crystal panels 1110R, 1110G, and 1110B, there is no need to provide a color filter.

In addition to the electronic apparatus described with reference to FIG. 7, a mobile personal computer, a cellular phone, a liquid crystal television set, a view-finder type or monitor direct-view type video tape recorder, a car navigation apparatus, a pager, an electronic notebook, an electronic calculator, a word processor, a workstation, a television telephone, a point-of-sale (POS) terminal, an apparatus provided with a touch panel, and the like may be adopted. Obviously, the invention is also applicable to any of such electrophoretic apparatuses.

The invention is not limited to the foregoing embodiments, and various modifications may be made to the invention without departing from the spirit and scope of the invention that can be understood from the claims and the entire specification. An electro-optical device substrate involving such modifications, an electro-optical device including the electro-optical device substrate, and an electronic apparatus including the electro-optical device also fall within the technical scope of the invention.

What is claimed is:

1. An electro-optical device substrate comprising:
   a first transparent substrate;
   a second transparent substrate that faces the first transparent substrate, the second transparent substrate including recesses in non-aperture regions of a surface of the second transparent substrate that faces the first transparent substrate, the recesses causing light that is incident to the non-aperture regions to refract toward aperture regions; and an adhesive that bonds the first and second transparent substrates together.

2. The electro-optical device substrate according to claim 1, wherein the adhesive is disposed inside the recesses.

3. The electro-optical device substrate according to claim 1, wherein the adhesive is disposed at least in the aperture regions and the non-aperture regions between the first and second transparent substrates.

4. The electro-optical device substrate according to claim 1, wherein a light-shielding film is formed at least in portions of the non-aperture regions of a surface of the second transparent substrate that is opposite the surface of the second transparent substrate facing the first transparent substrate.

5. The electro-optical device substrate according to claim 4, wherein the recesses are formed at least in light-shielding portions of the non-aperture regions, the light-shielding portions being portions where the light-shielding film is formed.

6. The electro-optical device substrate according to claim 5, wherein the light-shielding film is formed as a grid pattern defining the non-aperture regions, and wherein the recesses are formed in the light-shielding portions.

7. An electro-optical device comprising the electro-optical device substrate according to claim 1.

8. An electronic apparatus comprising the electro-optical device according to claim 7.

* * * * *